United States Patent
Raghavan et al.

(10) Patent No.: US 11,781,604 B2
(45) Date of Patent: Oct. 10, 2023

(54) ACTUATOR WITH POWDERED METAL BALL RAMP AND METHOD OF SELECTIVE SURFACE DENSIFICATION OF POWDERED METAL BALL RAMP

(71) Applicant: American Axle & Manufacturing, Inc., Detroit, MI (US)

(72) Inventors: Satyanarayanan Raghavan, Novi, MI (US); Daniel R. Bankovic, Kersey, PA (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 17/463,014

(22) Filed: Aug. 31, 2021

(65) Prior Publication Data
US 2022/0170515 A1   Jun. 2, 2022

Related U.S. Application Data

(60) Provisional application No. 63/120,312, filed on Dec. 2, 2020.

(51) Int. Cl.
*F16D 23/12* (2006.01)
*B22F 5/08* (2006.01)
(Continued)

(52) U.S. Cl.
CPC .............. *F16D 23/12* (2013.01); *B22F 3/164* (2013.01); *B22F 3/24* (2013.01); *B22F 5/085* (2013.01); *B22F 2003/166* (2013.01); *B22F 2003/248* (2013.01); *B22F 2998/10* (2013.01); *F16D 2023/123* (2013.01); *F16D 2200/0086* (2013.01); *F16D 2250/0023* (2013.01)

(58) Field of Classification Search
CPC .. B22F 3/164; B22F 3/24; B22F 5/085; B22F 2003/166; B22F 2003/248; F16D 2023/123
See application file for complete search history.

(56) References Cited

U.S. PATENT DOCUMENTS

| | | |
|---|---|---|
| 4,950,214 A | 8/1990 | Botterill |
| 5,711,187 A | 1/1998 | Cole et al. |

(Continued)

FOREIGN PATENT DOCUMENTS

| | | | |
|---|---|---|---|
| DE | 102014214297 A1 | 1/2016 | |
| DE | 102019112242 A1 * | 11/2019 | ............. F16D 23/12 |

OTHER PUBLICATIONS

Machine translation for DE102019112242A1 (Year: 2019).*

*Primary Examiner* — Brian D Walck
*Assistant Examiner* — Nazmun Nahar Shams
(74) *Attorney, Agent, or Firm* — Reising Ethington P.C.

(57) ABSTRACT

An actuator includes a first ball-ramp plate, a second ball-ramp plate, and a plurality of balls. The first ball-ramp plate is formed of compressed powdered metal with ramps having a higher density than at least part of a remainder of the ball-ramp component. A method of manufacturing the actuator includes compacting a metal powder to form a blank of the first ball-ramp plate including an annular body disposed about an axis and a plurality of ramps fixedly coupled to the annular body and spaced circumferentially about the axis, and locally densifying the ramps of the blank by applying force to a ramped surface of each ramp.

12 Claims, 8 Drawing Sheets

(51) Int. Cl.
 *B22F 3/24* (2006.01)
 *B22F 3/16* (2006.01)

(56) References Cited

U.S. PATENT DOCUMENTS

| | | |
|---|---|---|
| 5,810,141 A | 9/1998 | Organek et al. |
| 7,287,907 B2 | 10/2007 | Cadle et al. |
| 8,402,659 B2 * | 3/2013 | Kotthoff .................. B22F 5/08 29/893.3 |
| 8,733,527 B2 | 5/2014 | Greene |
| 9,377,060 B1 * | 6/2016 | Pritchard ................ F16D 23/12 |
| 10,184,531 B2 | 1/2019 | Saito et al. |
| 2004/0115084 A1 | 6/2004 | Sun et al. |
| 2005/0036899 A1 | 2/2005 | Lindenau et al. |
| 2018/0372168 A1 | 12/2018 | Beigang |
| 2019/0226565 A1 | 7/2019 | Gassmann |

* cited by examiner

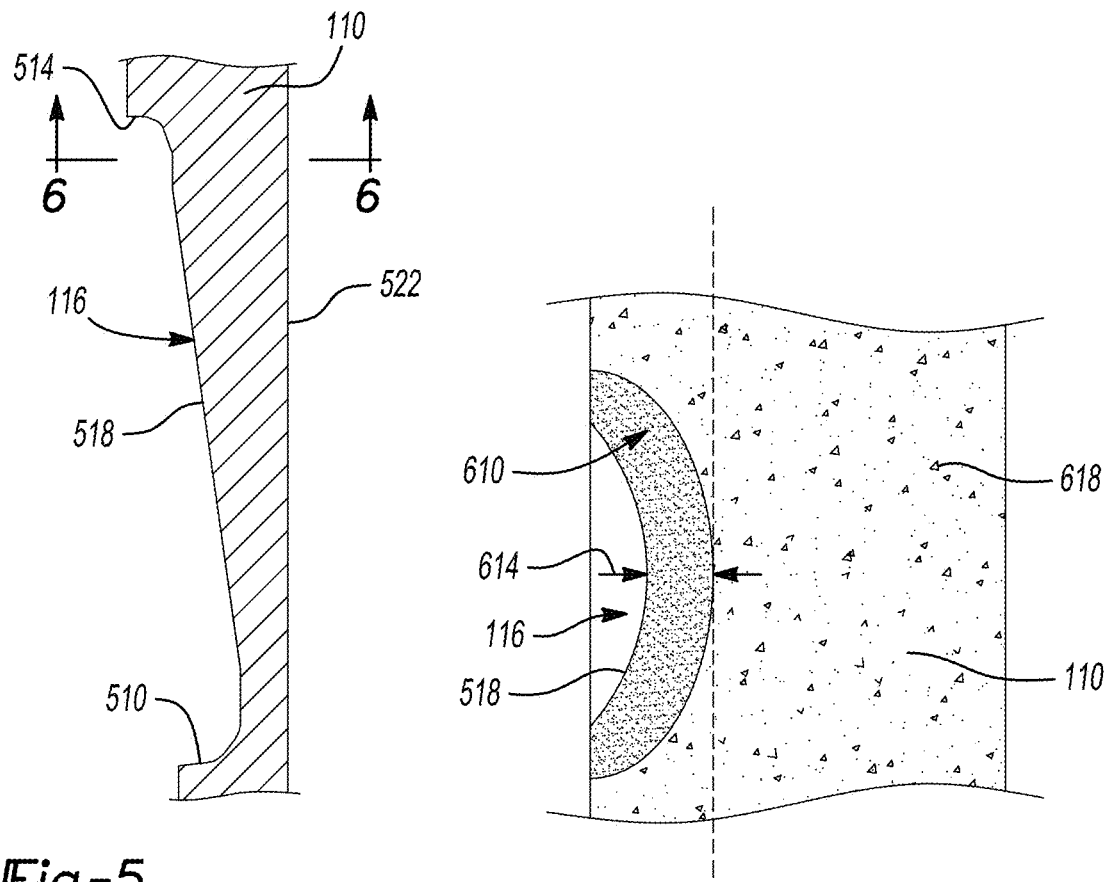
Fig-5
Fig-6
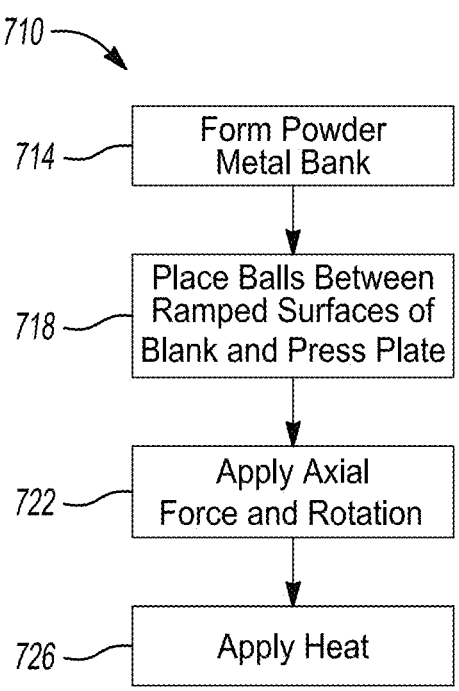
Fig-7

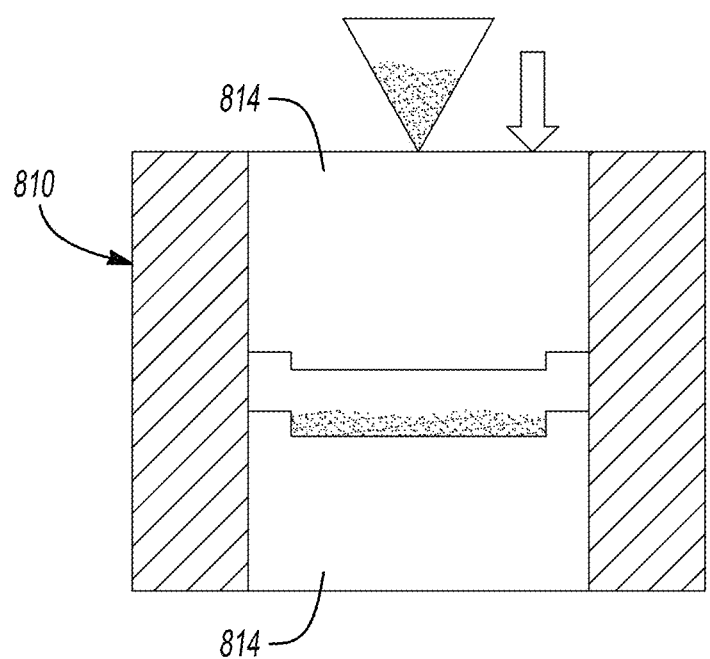
_Fig-8_
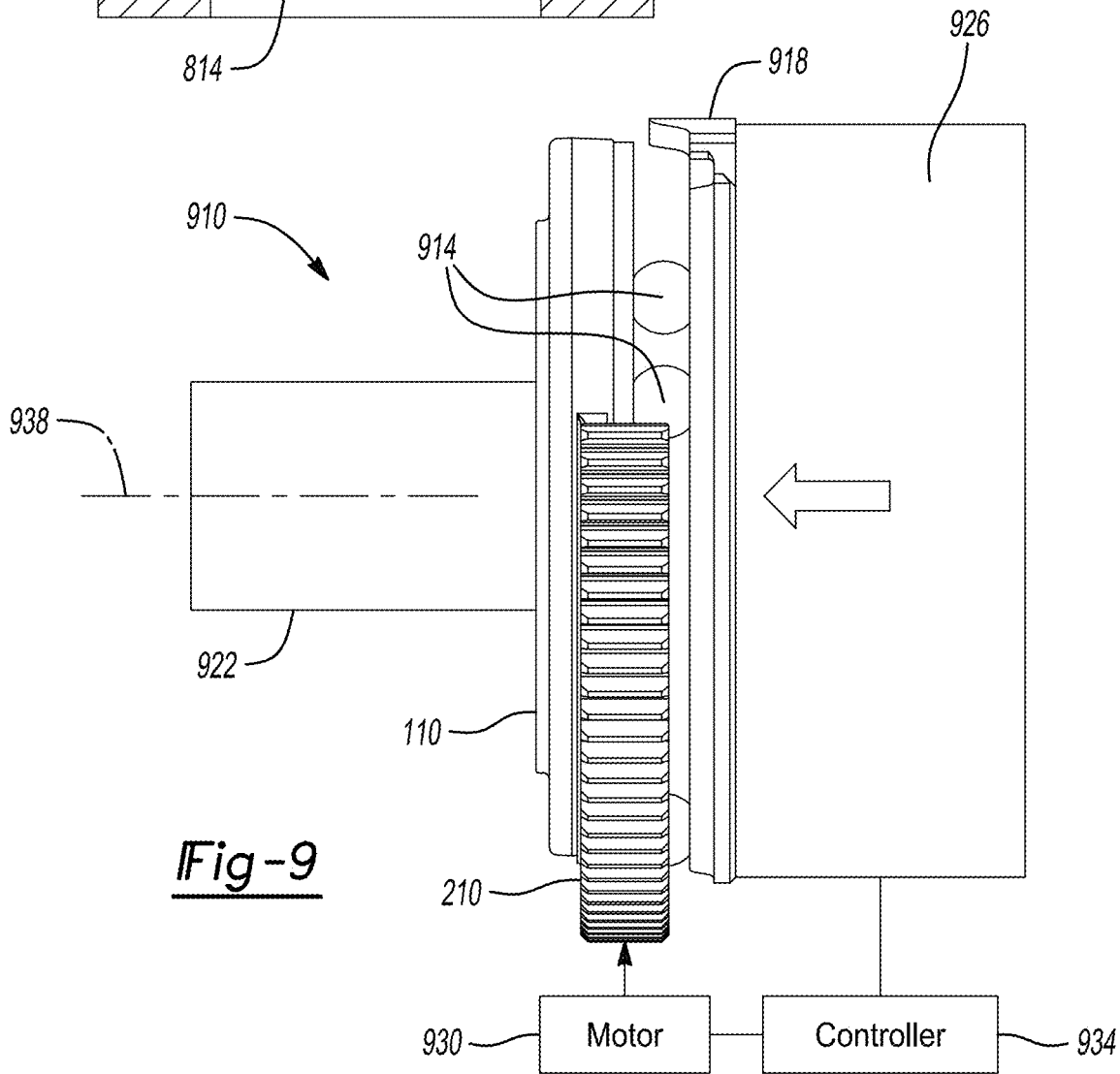
_Fig-9_

ACTUATOR WITH POWDERED METAL BALL RAMP AND METHOD OF SELECTIVE SURFACE DENSIFICATION OF POWDERED METAL BALL RAMP

CROSS-REFERENCE TO RELATED APPLICATIONS

This application claims the benefit of U.S. Provisional Application No. 63/120,312 filed Dec. 2, 2021, the disclosure of which is incorporated by reference as if fully set forth in detail herein.

FIELD

The present disclosure relates to a ball ramp actuator and a method of manufacturing the ball ramp actuator.

BACKGROUND

This section provides background information related to the present disclosure which is not necessarily prior art.

Ball-ramp mechanisms are commonly employed in various driveline components, such as differentials, axle assemblies, power take-off units and transfer cases, to produce thrust in response to relative rotational movement between a pair of ball-ramp rings. The ball-ramp rings of the ball-ramp mechanism are typically disposed about a rotational axis and are sized in diameter in relation to the amount of thrust that is required. Conventional ball-ramp mechanisms are formed of hardened steel or alloys to provide strength in the ramps suitable for handling the forces exerted thereon by the balls during actuation.

Powder metal ("PM") compaction is a manufacturing process in which a metal powder is compacted by uniaxial force in a closed die and related tooling and sintered to form a component. The process is commonly employed to fabricate components in a way that some or all of the features of the component are net formed (i.e., formed to a finished size so that no machining is necessary). Conventional PM compaction results in parts with a sinter-hardened grade such as FLC-4608-175HT with a density of about 7.2 g/cm³, which typically results in a maximum contact pressure of the balls of about 1,000 MPa before deformation of the PM ball ramp components will occur. Other PM parts, considered alloy grade such as FL2-4405, typically have a green density of about 7.35 g/cm3 and a maximum contact pressure of about 1,800-1900 MPa. Still, other typical PM constructions have lower maximum contact pressures: e.g., Astaloy 85Mo+ 0.5% C, typically has a maximum contact pressure of about 1350 MPa; Distaloy DC-1+0.15% C typically has a maximum contact pressure of about 1410 MPa, and Astaloy Mo+0.6% C typically has a maximum contact pressure of about 1500 MPa. However, some ball ramp actuator applications, such as those requiring high axial thrust, require contact pressures in excess of 2,000 MPa, with some exceeding 2850 MPa or more.

Thus, while it is possible to use conventional PM compaction to construct ball ramp components for some applications, ramp plates made of conventional PM processes result in lower density and contact strength than traditionally formed (e.g., machined) ball ramp components and may not be suitable for some high load applications. However, conventionally formed ball ramp components can be costly and can add to the weight of the actuator.

The PM ball ramp and methods of forming ball ramp components disclosed herein address these and other issues with traditional ball ramp actuators.

SUMMARY

A method of manufacturing an actuator, including a first ball-ramp plate, a second ball-ramp plate, and a plurality of balls disposed between the first ball-ramp plate and the second ball-ramp plate, according to the present disclosure includes compacting a metal powder to form a blank of the first ball-ramp plate. The blank includes an annular body disposed about an axis and a plurality of ramps fixedly coupled to the annular body and spaced circumferentially about the axis. The method further includes locally densifying the ramps of the blank that includes a first contact surface defined by each of the ramps.

In one example, locally densifying the portions of the blank includes placing a plurality of rounded bodies between the first contact surfaces and a press plate, applying an axial force to at least one of the blank and the press plate to press the rounded bodies against the first contact surfaces, and rolling the rounded bodies along the first contact surfaces while applying the axial force.

In another example, rolling the rounded bodies along the first contact surfaces includes rotating one of the blank and the press plate about the axis relative to the other one of the blank and the press plate while applying the axial force.

In yet another example, the rounded bodies are balls.

In still another example, locally densifying the portions of the blank further includes varying at least one of a magnitude of the axial force and an area on the blank over which the axial force is distributed while rotating the at least one of the blank and the press plate and applying the axial force.

In a further example, the first contact surfaces are recessed to at least partially define grooves.

In still a further example, locally densifying the portions of the blank includes providing a press die including a plurality of ramped press surfaces, aligning each ramped press surface with a corresponding one of the first contact surfaces, and pressing the ramped press surfaces against the first contact surfaces.

In another example, each of the ramped press surfaces is matingly contoured to the corresponding one of the first contact surfaces.

In yet another example, the first contact surfaces are formed onto a forward axial face of the annular body and wherein pressing the ramped press surfaces against the first contact surfaces includes abutting rear surface of the annular body against a support die and applying an axial force to the press die.

In still another example, the locally densified portions of the blank have a density of at least 7.4 grams per cubic cm.

In a further example, portions of the blank other than the locally densified portions of the blank have a density that is less than 7.4 grams per cubic cm.

In yet a further example, wherein the locally densified portions of the blank have a density that is greater than or equal to 7.6 grams per cubic cm.

In still a further example, the metal powder contains less than 0.3% carbon by weight.

In another example, the metal powder comprises a sinter-hardening composition.

In still another example, compacting the metal powder to form the blank is performed at a temperature that is below a temperature at which graphite reacts with iron but higher than a temperature at which iron particle sinter bonds develop.

In yet another example, the method further includes heat treating the blank after locally densifying the portions of the blank.

In another form, an actuator for a vehicle driveline component includes a housing, a first ball-ramp plate, a second ball-ramp plate, and a plurality of balls. The first ball-ramp plate includes a first annular body disposed about an axis. The first annular body defines a plurality of first ramps that are spaced circumferentially about the axis. Each of the first ramps has a first contact surface. The first ball-ramp plate is formed of a compressed powdered metal. Portions of the first ball-ramp plate are densified relative to other portions of the first ball-ramp plate. The portions of the first ball-ramp plate that are densified include the first contact surfaces of the first ramps. The second ball-ramp plate includes a second annular body disposed about the axis. The second annular body defines a plurality of second ramps that are spaced circumferentially about the axis. Each of the second ramps has a second contact surface. The balls are disposed between the first contact surfaces and the second contact surfaces. One of the first ball-ramp plate and the second ball-ramp plate is supported for rotation about the axis relative to the housing, while the other one of the first ball-ramp plate and the second ball-ramp plate is non-rotatable relative to the housing.

In one example, the densified portions of the first ball-ramp plate have density of at least 7.4 grams per cubic cm.

In another example, each of the densified portions of the first ball-ramp plate has a density of at least 7.6 grams per cubic cm for a depth from a the first contact surface of at least 0.3 millimeters.

Further areas of applicability of the present disclosure will become apparent from the detailed description, the claims and the drawings. The detailed description and specific examples are intended for purposes of illustration only and are not intended to limit the scope of the disclosure.

DRAWINGS

The drawings described herein are for illustrative purposes only of selected embodiments and not all possible implementations, and are not intended to limit the scope of the present disclosure.

FIG. 5 is a cross-sectional view of a portion of a ball-ramp ring of the ball-ramp mechanism of FIG. 4, taken along arc 5-5 shown in FIG. 4;

FIG. 6 is a cross-sectional view of a portion of the ball ramp ring of FIG. 5, taken along line 6-6, schematically illustrating a powder metal density of the ball ramp component;

FIG. 7 is a flow chart of a method of manufacturing a ball ramp component in accordance with the teachings of the present disclosure;

FIG. 8 is a schematic view of a set of dies for forming a powdered metal blank ball ramp component in accordance with the teachings of the present disclosure;

FIG. 9 is a schematic side view of a blank of a ball ramp component and a tool, in accordance with the teachings of the present disclosure, for manufacturing the ball ramp component using the method of FIG. 7;

Corresponding reference numerals indicate corresponding parts throughout the several views of the drawings.

DETAILED DESCRIPTION

Figure 1:
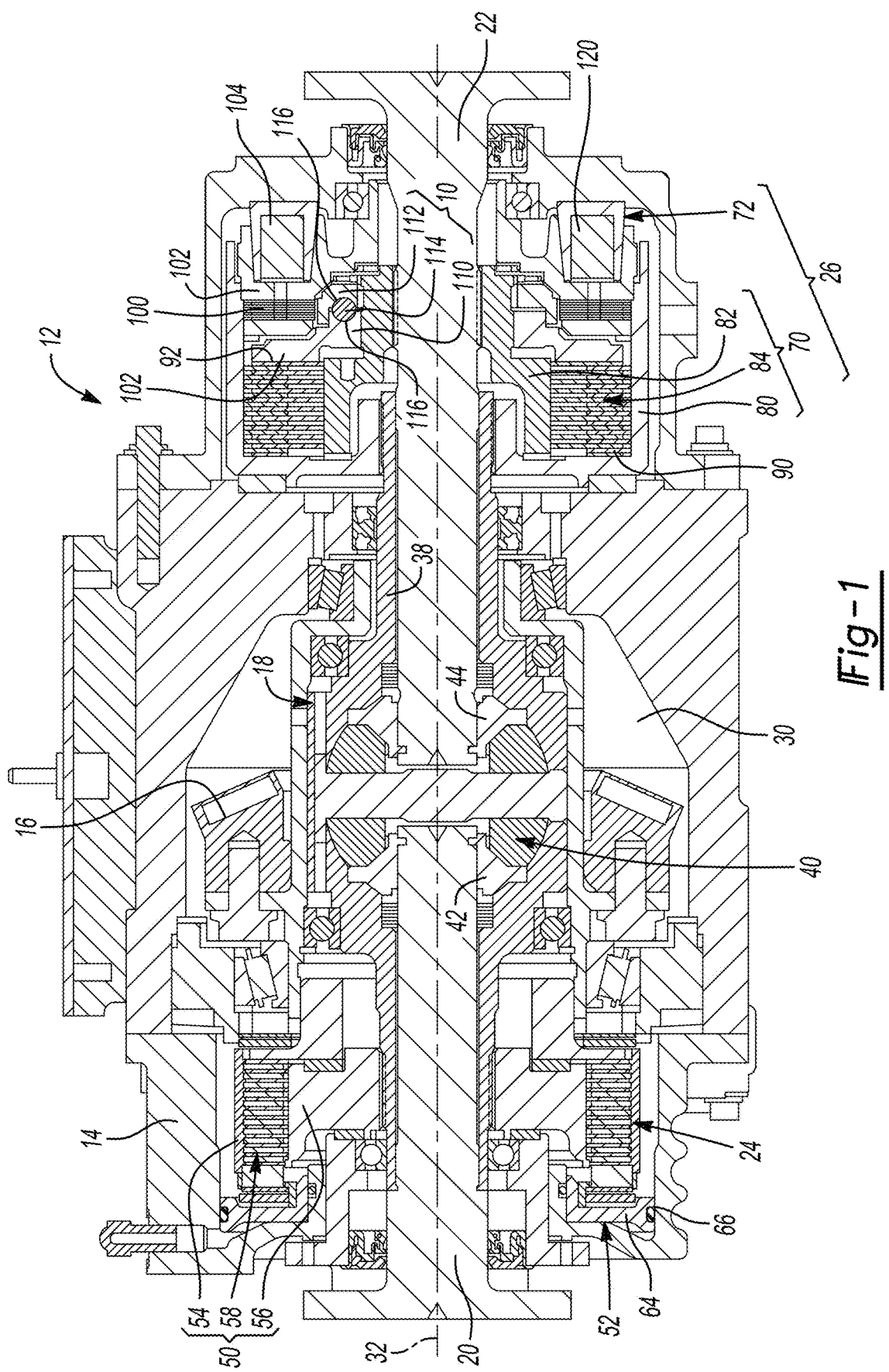
FIG. 1 is a transverse section view of a first vehicle driveline component having a ball-ramp mechanism constructed in accordance with the teachings of the present disclosure.

With reference to FIG. 1, an exemplary ball-ramp mechanism constructed in accordance with the teachings of the present disclosure is generally indicated by reference numeral 10. The ball-ramp mechanism 10 is shown in an exemplary vehicle driveline component that is illustrated to be a rear axle assembly 12 having a housing 14, a ring gear 16, a differential assembly 18, first and second output shafts 20 and 22, a first clutch assembly 24 and a second clutch assembly 26. The housing 14 conventionally defines a cavity 30 and a differential axis 32. The ring gear 16 is received in the cavity 30 and is supported by the housing 14 for rotation about the differential axis 32. The ring gear 16 is meshingly engaged with an input pinion (not shown) that is received in the cavity 30 and supported by the housing 14 for rotation about a pinion axis (not shown) that is transverse to the differential axis 32.

The differential assembly 18 is disposed in the cavity 30 and includes a differential input 38 and a differential gearset 40. The differential input 38 is rotatable relative to the ring gear 16 about the differential axis 32 and provides rotary power to the differential gearset 40. The differential gearset 40 includes a pair of side gears 42 and 44 that are rotatable relative to the differential input 38 about the differential axis 32. The side gears 42 and 44 are the outputs of the differential assembly 18. The first output shaft 20 is rotationally coupled to the side gear 42, while the second output shaft 22 is rotationally coupled to the side gear 44. The first clutch assembly 24 is configured to selectively couple the differential input 38 to the ring gear 16 for rotation therewith.

The first clutch assembly 24 is configured to selectively decouple the ring gear 16 from the differential assembly 18. The first clutch assembly 24 can include a first clutch 52 and a first actuator 52. The first clutch 50 can be any type of clutch, such as a friction clutch having an outer clutch basket 54, a clutch hub 56 and a clutch pack 58. In the example provided, the outer clutch basket 54 is a clutch input member and is coupled to the ring gear 16 for rotation therewith about the differential axis 32, the clutch hub 56 is coupled to the differential input 38 for common rotation about the differential axis 32, and the clutch pack 58 has two sets of clutch plates that are each non-rotatably but axially slidably coupled to an associated one of the outer clutch basket 54 and the clutch hub 56. The first actuator 52 can be any mechanism that can be configured to operate the first clutch 50, such as a hydraulic cylinder that includes a piston 64 that is movably mounted in a bore 66 in the housing 14. A pressurized hydraulic fluid can be employed to translate the piston 64 in the bore 66 to compress the clutch pack 58 to drivingly couple the clutch hub 56 to the outer clutch basket 54 to thereby transmit rotary power from the ring gear 16 to the differential input 38.

The second clutch assembly 26 is configured to limit speed differentiation between the first and second output shafts 20 and 22. In the example provided, the second clutch assembly 26 includes a friction clutch 70 and a second actuator 72. The friction clutch 70 includes an outer clutch basket 80, a clutch hub 82 and a clutch pack 84. The outer clutch basket 60 is the input of the friction clutch 70 and is rotationally coupled to the differential input 38, while the clutch hub 82 is the output of the friction clutch 70 and is rotationally coupled to the second output shaft 22. The clutch pack 84 includes a plurality of first clutch plates 90, which are rotationally coupled to the outer clutch basket 80, and a plurality of second clutch plates 92 that are interleaved with the first clutch plates 90 and rotationally coupled to the clutch hub 82.

The second actuator 72 includes the ball-ramp mechanism 10, a secondary clutch pack 100, a pair of apply plates 102 and a secondary actuator 104. The ball-ramp mechanism 10 will be discussed in more detail below, but generally includes a first ball-ramp ring 110, a second ball-ramp ring 112 and a plurality of balls 114 that are disposed between the first and second ball-ramp rings 110 and 112 in ball tracks or grooves 116 formed in each of the first and second ball-ramp rings 110 and 112. Each of the ball tracks or grooves 116 has a contact surface against which a corresponding one of the balls 114 is disposed. The first and second ball-ramp rings 110 and 112 are also referred to herein as ball-ramp plates and are concentrically disposed about an actuation axis (i.e., the differential axis 32 in the example provided) and are rotatable relative to one another about the actuation axis. The first and second ball-ramp rings 110 and 112 can be disposed radially between the outer clutch basket 82 and the clutch hub 84.

The first ball-ramp ring 110 can abut one of the second clutch plates 92 and can be rotationally coupled to the clutch hub 84. The secondary clutch pack 100 has a plurality of first friction plates, which are non-rotatably coupled to the outer clutch basket 80, and a plurality of second friction plates that are interleaved with the first friction plates and non-rotatably coupled to the second ball-ramp ring 112. The apply plates 102 can be disposed on the opposite axial ends of the secondary clutch pack 100 and can be coupled to the outer clutch basket 80 for rotation therewith.

The secondary actuator 104 can be any type of actuator that cause relative axial movement between the apply plates 102 to selectively compress the secondary clutch pack 100 therebetween. For example, the secondary actuator 104 could be configured as a hydraulic cylinder. In the example provide, however, the secondary actuator comprises an annular electromagnet 120. The electromagnet 120 is fixedly coupled to the housing 14 and is configured to selectively generate a magnetic field that can draw the distal apply plate 102 along the differential axis 32 toward the secondary clutch pack 100 and the other (proximal) apply plate 102.

When electric power is applied to the electromagnet 120 to cause the electromagnet 120 to generate the magnetic field, the distal apply plate 102 responsively moves toward the electromagnet 120 and compresses the secondary clutch pack 100 between itself (i.e., the distal apply plate 120) and the proximal apply plate 102, which is fixedly coupled to the outer clutch basket 80, so as to transfer rotary power from the outer clutch basket 80 through the secondary clutch pack 100 to the second ball-ramp ring 112. The magnitude of the torque transmitted through the secondary clutch pack 100 is dependent upon the strength of the magnetic field. Consequently, the amount of relative rotation between the first and second ball-ramp rings 110 and 112, which controls the axial distance by which the ball-ramp mechanism 10 can compress the clutch pack 84 of the friction clutch 70 and therefore the amount of torque that can be passed through the friction clutch 70 between the differential input 38 and the second output shaft 22, can be controlled by varying the strength of the magnetic field that is produced by the electromagnet 120.

While the ball-ramp mechanism 10 has been illustrated and described in conjunction with a rear axle assembly and operated in response to the application of a magnetic field, it will be appreciated that a ball-ramp mechanism constructed in accordance with the teachings of the present disclosure can be incorporated into various other types of vehicle driveline components, such as transfer cases, transmissions, transaxles and power take-off units (PTU's), and/or that the ball-ramp mechanism could be operated in various other ways, including via a rotary electric motor that drives one of the first and second ball-ramp rings relative to the other one of the first and second ball-ramp rings, either directly or through differential rotary motion that can be imparted through meshing engagement of a gear with one or both of the first and second ball-ramp rings, or through magnetic fields or eddy currents that are applied to one or both of the first and second ball-ramp rings.

Figure 2:
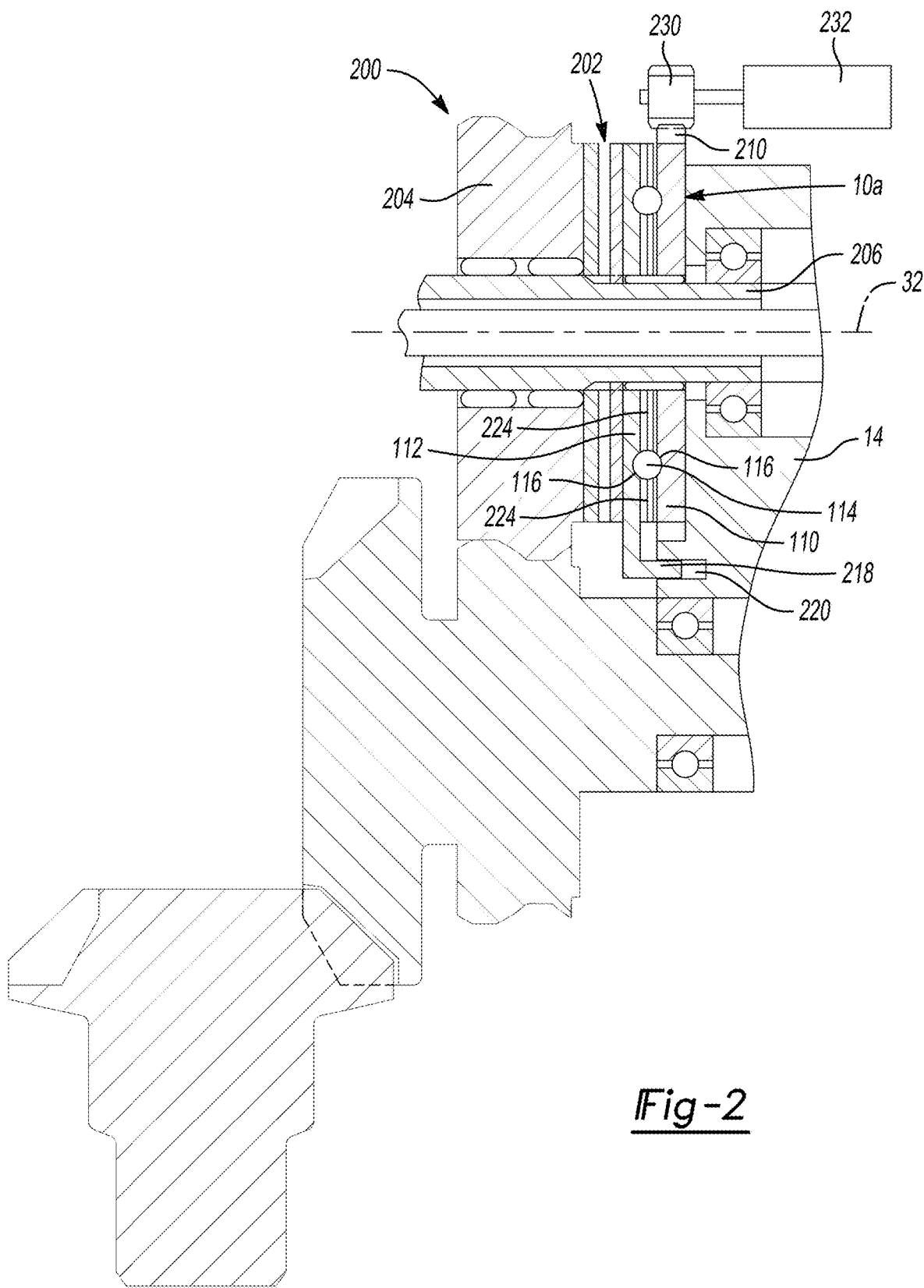
FIG. 2 is a transverse section view of a portion of a second vehicle driveline component having a ball-ramp mechanism constructed in accordance with the teachings of the present disclosure.

In the example of FIG. 2, the ball-ramp mechanism 10a is shown in a PTU 200 and is configured to control engagement of a friction clutch 202 that is disposed between a PTU input member 204 and a differential input member 206 of a front differential (not fully shown). Except as described below, the ball-ramp mechanism 10a can be identical to the ball-ramp mechanism 10 described above.

Figure 3:
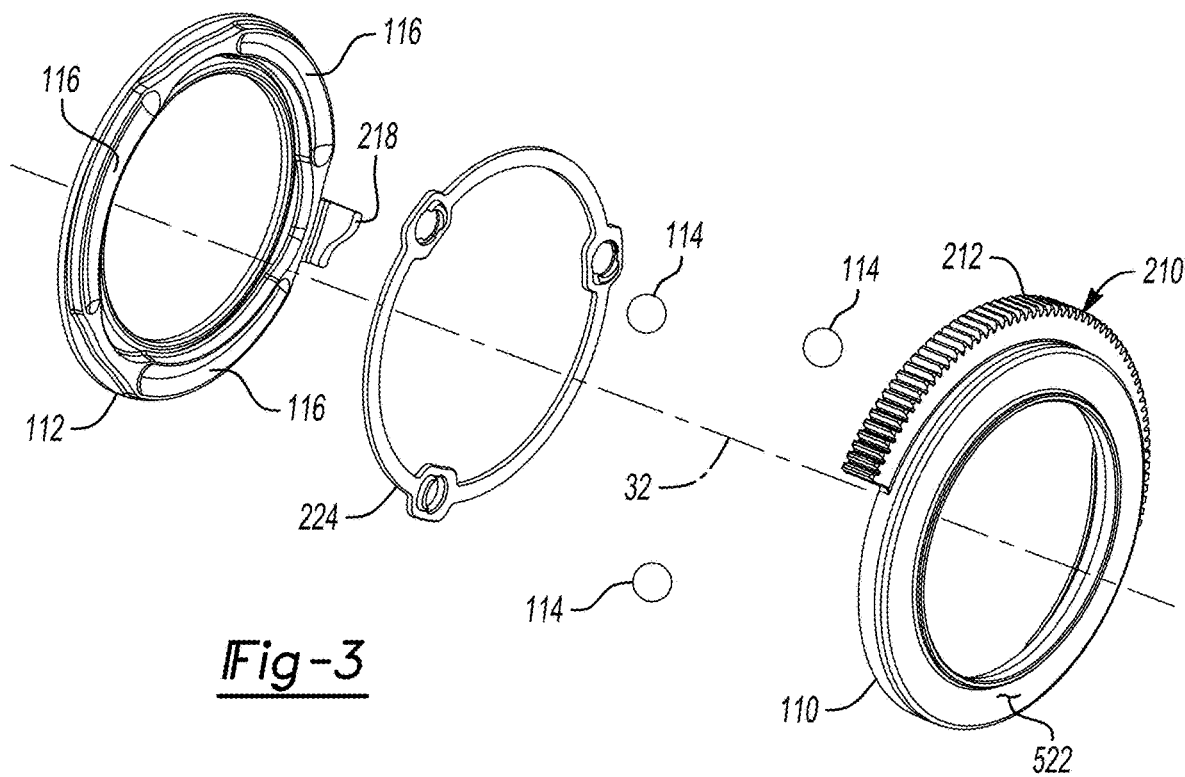
FIGS. 3 and 4 are exploded perspective views of a portion of the ball-ramp mechanism of FIG. 2, taken from right and left sides respectively.
Figure 4:
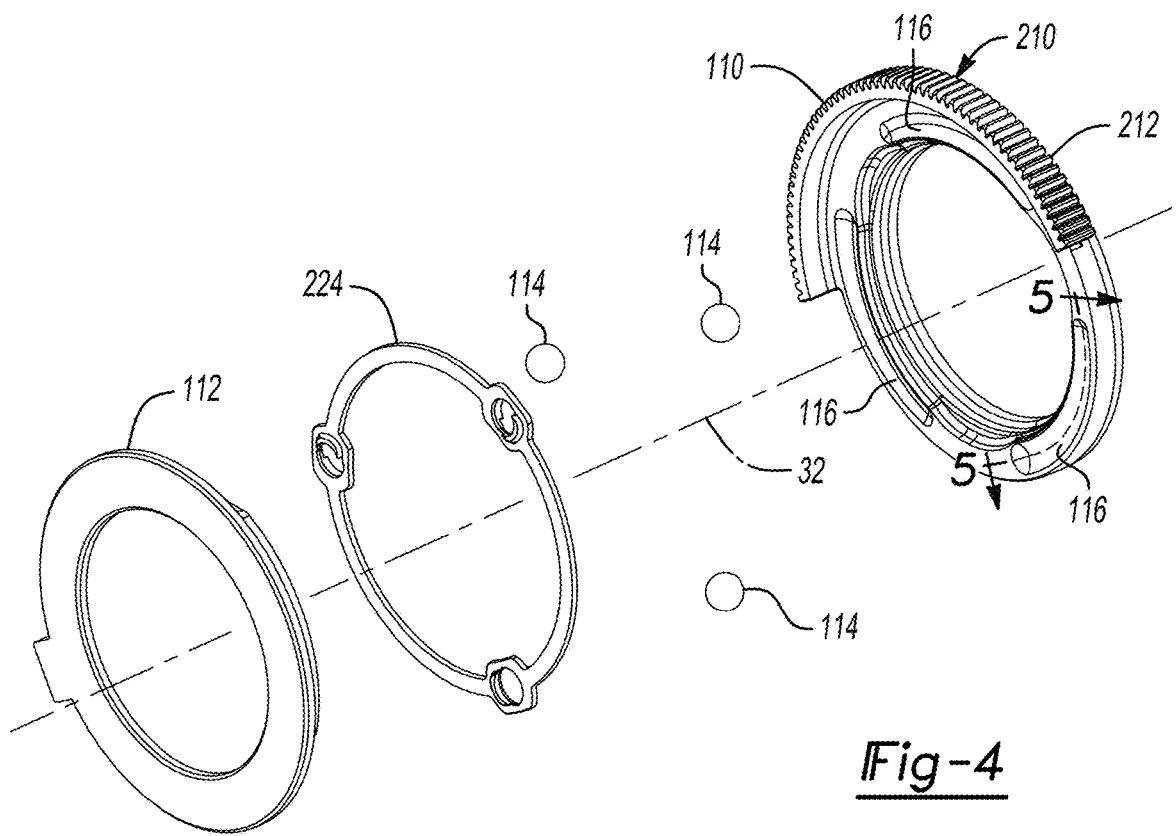

Referring to FIGS. 2-4, a gear element, such as a sector gear 210, is fixedly coupled to the first ball-ramp ring 110 and includes a plurality of sector gear teeth 212. In the example provided, the sector gear 210 is unitarily and integrally formed with the first ball-ramp ring 110, but it will be appreciated that the sector gear 210 could be formed as a discrete component and assembled to the first ball-ramp ring 110 or could be formed onto the first ball-ramp ring 110 (e.g., formed of plastic that is overmolded onto the first ball-ramp ring 110). In the example provided, the first ball-ramp ring 110 is supported by a housing 214 of the PTU 200 for rotation about an actuation axis, which is a front differential axis 32 in the particular example shown. It will be appreciated, however, that the first ball-ramp ring 110 could be non-rotatable relative to the housing 214.

The second ball-ramp ring 112 is non-rotatably but axially slidably coupled to the housing 214 for movement along the actuation axis in the particular example provided. It will be appreciated that the second ball-ramp ring 112 could be rotatable relative to the housing 214 in the alternative, and/or that the second ball-ramp ring 112 could be axially stationary relative to the housing 214 while the first ball-ramp ring 110 could move axially relative to the housing along the actuation axis. In the example provided, the second ball-ramp ring 112 includes an L-shaped tab 218 that is configured to be received in an axially extending slot 220 formed in the housing 214. Each of the balls 114 is received into an associated set of the ball tracks 116 in the first and second ball-ramp rings 110 and 112. If desired, the balls 114 can be received in an annular cage 224 that maintains the circumferential spacing of the balls 114 in a desired manner. The sector gear teeth 212 can be engaged by an input gear 230 that is driven by an electric motor 232. In the example provided, the sector gear 210 is a portion of a spur gear and the input gear 230 is another spur gear that meshingly engages the spur gear. It will be appreciated, however, that the sector gear 210 and the input gear 230 could be configured differently (e.g., as helical gears or as a worm gear and worm, respectively), and that a gear reduction could be employed between the electric motor 232 and the input gear 230.

Referring to FIG. 5, a cross-sectional view of a portion of the first ball-ramp ring 110 including one of the tracks 116 is illustrated taken along arc 5-5 shown in FIG. 4. The other tracks 116 can be similar to the track 116 illustrated and described with reference to FIG. 5 and the tracks 116 can be equally spaced in the circumferential direction about the axis 32 (FIG. 4). The track 116 has a first end 510 and a second end 514 and extends therebetween in an arc that is concentric with the first ball-ramp ring 110. The track 116 has a ramp or contact surface 518 that varies in height, i.e., position in the axial direction relative to a back surface 522 of the first ball-ramp ring 110, along the length of the track 116. In other words, the ramp surface 518 is axially closer to the back surface 522 at the first end 510 than at the second end 514. One of balls 114 is configured to roll along the ramp surface 518 of each track 116.

Referring to FIGS. 5 and 6, the first ball-ramp ring 110 is formed of compacted powdered metal and the compact powdered metal of the first ball-ramp ring 110 is denser in a region 610 proximate the ramp surface 518 than throughout the remainder of the first ball-ramp ring 110. In other words the first ball-ramp ring 110 is locally denser in the region 610. The denser region 610 includes the ramp surface 518 and extends into the first ball-ramp ring 110 by a depth 614.

The compact metal can be of any suitable type of metal powder such as steel alloy powders. The compact metal can be relatively ductile and easily deformed. In one example, the compact metal can have a carbon content of less than 0.3% by weight, though other configurations can be used. One non-limiting example includes a FLN2 4405 material, e.g., 2% by weight of nickel and 0.85% by weight of molybdenum with less than 0.3% by weight of carbon. Another non-limiting example includes FL 4405 material, e.g., 0.85% by weight of molybdenum with less than 0.3% by weight of carbon. In one form, the carbon content can be added (e.g., as graphite) for pre-sintering at low temperatures. In another form, the carbon can be added (e.g., as graphite) for sintering at high temperature. In another non-limiting example, a sinter-hardening material such as FLC2 4808 can be used.

In one example, the denser region 610 extends an entire length of the track 116. In another example, the denser region 610 is located along less than the entire track 116, such as being only located near the second end 514 or being near the second end 514 and also extending along some of the track 116 but not fully to the first end 510. In one example, the denser region 610 has a minimum density of 7.4 grams per cubic cm and substantially the remainder of the first ball-ramp ring 110 has a density of less than 7.4 grams per cubic cm. In one example, the denser region 610 has a minimum density of 7.6 grams per cubic cm. In one example, the depth 614 of the denser region 610 is between 0.3 mm and 1 mm. FIG. 6 schematically illustrates a microstructure of the first ball-ramp ring 110 including the locally denser region 610, in which the powdered metal particles 618 are more densely packed. The schematic microstructure illustrated in FIG. 6 is not to scale and is intended merely for illustrative purposes. Thus, the region 610 is harder than the remainder of the first ball-ramp ring 110 and the remainder of the first ball-ramp ring 110 can be a lighter and more ductile composition.

While described herein with reference to the first ball-ramp ring 110, the second ball-ramp ring 112 can be constructed similarly such that the second ball-ramp ring 112 can be similarly formed of compressed powdered metal with a locally densified region (similar to region 610) extending in from the ramp surfaces (similar to ramp surfaces 518) along the tracks 116 of the second ball-ramp ring 112.

Referring to FIG. 7, a method 710 for forming a ball-ramp ring (e.g., the first ball-ramp ring 110 or the second ball ramp ring 112) is illustrated in flow chart form. At step 714, the method 710 includes forming a compacted powder metal blank. At step 714 and with additional reference to FIG. 8, the powdered metal is introduced into a powdered metal press 810 and dies 814 compress the powdered metal therein. The dies 814 press the powdered metal into the finished shape of the ball-ramp ring 110, 112. The compacted powdered metal ball-ramp ring 110, 112 may then be heated such that the powdered metal is partially sintered or "pre-sintered" at temperatures below the graphite reaction with iron, but high enough for iron particle sinter bonds to develop (e.g., below 1600° F. (871° C.)). Thus, pre-sintering occurs at temperatures below typical sintering temperatures which are typically greater than 2000° F. (1093° C.). The pre-sintering can occur in a furnace (not shown) or other heating device separate from the dies 814 such that the compacted powdered metal ball ramp ring 110, 112 is removed from the dies, and placed in a furnace (not shown) within which it is pre-sintered. In this way, the forming stress remains relatively low. At this stage, the ball-ramp ring 110 or 112 is in a green or blank form as it is not fully sintered and is referred to herein as being the green or blank first ball-ramp ring 110 or the green or blank second ball-ramp ring 112. It will be appreciated that the dies 814 illustrated in FIG. 8 are merely schematic representations and the dies 814 may be formed in two or more pieces that can move along one or more axes for compression therein of the blank ball-ramp ring.

Figure 10:
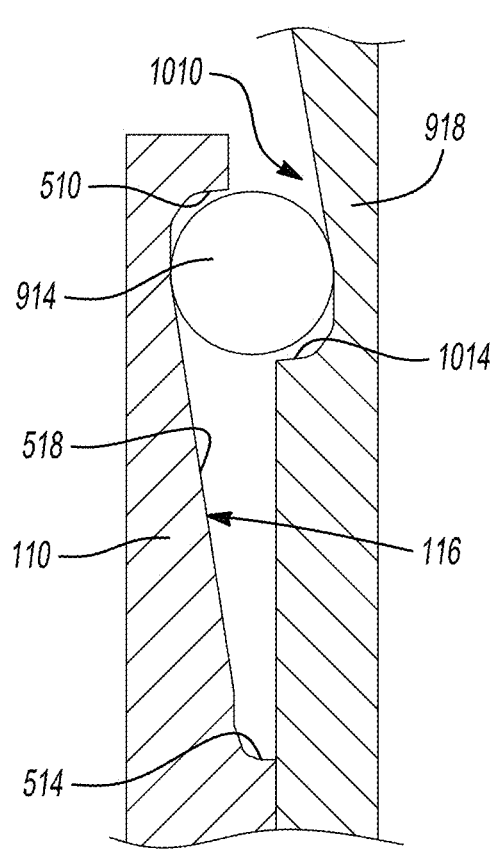
FIG. 10 is a schematic cross-sectional view of a portion of the blank of the ball ramp component and the tool of FIG. 9, illustrating the blank and the tool in a first position.

With additional reference to FIGS. 9 and 10, the method 710 can proceed to step 718 in which the blank first ball-ramp ring 110 is loaded into a densifying tool system 910. The densifying tool system 910 includes a plurality of rounded tool bodies 914, a tool press-plate 918, a shaft 922, a press 926, a motor 930, and a controller 934. The rounded tool bodies 914 are placed in the tracks 116 of the blank first ball-ramp ring 110. In the example provided, the rounded tool bodies 914 are balls and are also referred to herein as tool balls 914. In one example, the tool balls 914 can be the same balls used in the final ball-ramp mechanism 10a (e.g., the balls 114 of FIGS. 2-4). In another example, the tool balls 914 can be balls that are dedicated only for use in locally densifying ball-ramp rings using the method 710. In the example provided, the tool balls 914 have the same dimensions as the balls 114 (FIGS. 2-4), though other configurations can be used such as smaller diameter balls or slightly larger diameter balls for example.

At step 718, the blank first ball-ramp ring 110 is supported for rotation about a tool axis 938. In the example provided, the first ball-ramp ring 110 is mounted to the shaft 922 for rotation about the tool axis 938, though other configurations can be used, such as a chuck (not shown). The tool press-plate 918 defines tracks 1010 that can be similar to the tracks 116 of the second ball-ramp ring 112 (FIGS. 2-4) and is supported by the press 926 and aligned coaxially with the blank first ball-ramp ring 110. The press 926 is configured to move the tool press-plate 918 axially relative to the first ball-ramp ring 110.

Each tool ball 914 is captured between an opposing pair of the tracks 116 of the blank first ball-ramp ring 110 and the tracks 1010 of the tool press-plate 918. The motor 930 is configured to rotate the blank first ball-ramp ring 110 about the tool axis 938 along an angular range that is less than a full rotation. In the example provided, the motor 930 is drivingly coupled to the sector gear 210 of the blank first ball-ramp ring 110. In another example, not specifically shown, the motor 930 is drivingly coupled to the shaft 922.

Figure 11:
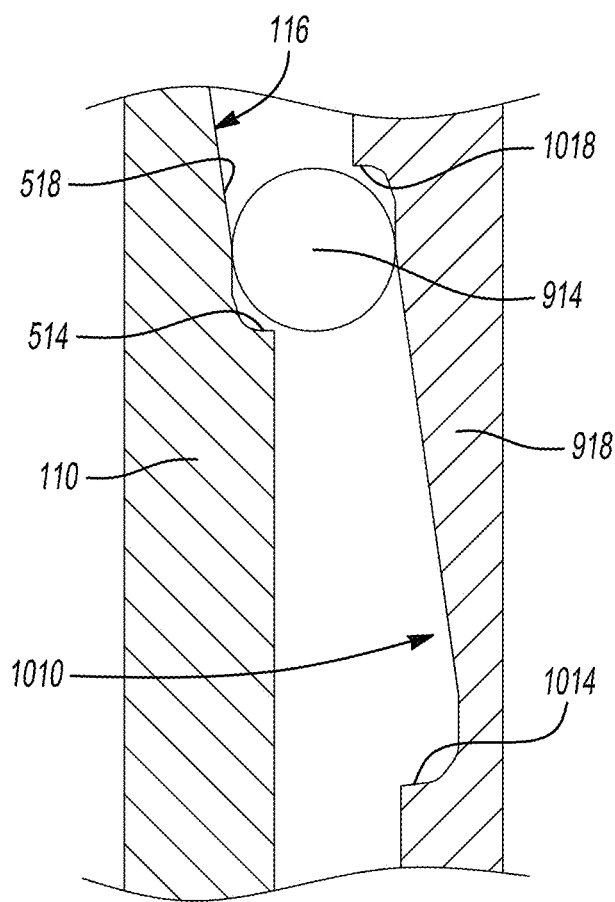
FIG. 11 is a schematic cross-sectional view similar to FIG. 10, illustrating the blank and the tool in a second position.

The angular range is less than or equal to an angular range in which each track 116 extends. In the example provided, the angular range is such that the tool balls 914 start at the first ends 510, 1014 of the tracks 116, 1010 (as shown in FIG. 10) and end at the second ends 514, 1018 of the tracks 116, 1010 (as shown in FIG. 11). The motor 930, or a transmission (not shown) coupled thereto, can be configured to reverse the rotational direction to allow reversible rotation along the angular range. The controller 934 is coupled to the motor 930 and the press 926 and configured to control and synchronize operation thereof.

At step 722, the press 926 applies axial force in the direction toward the blank first ball-ramp ring 110 while the motor 930 rotates the blank first ball ramp ring 110 through the angular range to locally compact the powdered metal of the blank first ball-ramp ring 110 in the tracks 116. As illustrated in FIGS. 10 and 11, as the blank first ball-ramp ring 110 is rotated, the controller 934 controls the press such that the axial position of the tool press-plate 918 changes relative to the blank first ball-ramp ring 110. In one form, the controller 934 controls the axial position of the press 926 (i.e., the axial force that is applied by the press 926) to apply a consistent pressure on the tracks 116 along the entire angular range to compress the powdered metal of the tracks 116 uniformly along the angular range. In another example, the controller 934 can control the axial position of the press 926 to apply different pressures along the angular range to achieve different densities along the angular range of the tracks 116. For example, the controller 934 can be configured to provide greater force (e.g., more compaction) in regions along the angular range that will be exposed to greater forces during operation of the finished ball-ramp mechanism 10a. The force can be sufficient for the tool balls 914 to locally compress the powdered metal to form the locally dense region 610 (FIG. 6).

While the particular example illustrated provides one form for applying pressure to the blank first ball-ramp ring 110 while varying axial position, other configurations can be used. In on alternate form, not specifically shown, the motor 930 rotates the tool press-plate 918 and the press 926 moves the blank first ball-ramp ring 110 axially. In another alternate form, the motor 930 can rotate the tool press-plate 918 and the press 926 moves the tool press-plate 918 axially while the blank first ball-ramp ring 110 is held stationary. In another alternate form, the motor 930 rotates the blank first ball-ramp ring 110 and the press 926 moves the blank first ball-ramp ring 110 axially while the tool press-plate 918 is held stationary.

In another alternative configuration, the tool press-plate 918 can be replaced with the blank second ball-ramp ring 112 and the blank first ball-ramp ring 110 can be replaced with a tool press-plate that can include tracks similar to the tracks 116 of the first ball-ramp ring 110. Thus, the tracks 116 of the blank second ball-ramp ring 112 can be densified. In still another configuration, tool balls 914 can be disposed between the blank first ball-ramp ring 110 and the blank second ball-ramp ring 112 such that they can locally densify both ball-ramp rings 110 and 112 simultaneously.

After applying axial force and rotation at step 722, the method 710 can proceed to step 726 in which the locally densified blank ball-ramp ring 110 or 112 can be heated to be fully sintered. For example, the locally densified blank ball-ramp ring can be heated in a furnace (not shown) to above the temperature at which the free graphite can reacts with iron to form a high strength alloy (e.g., above 2000° F. (1093° C.). In one example, the alloy may optionally be further heat treated by neutral or carburized hardening. In an alternative configuration, sinter hardening compositions (e.g., those based on MPIF 4600, 4800, 4900, 5300 grades) can be used. In one form, the finished part maintains a carbon content of less than 0.3%, though other configurations can be used.

Figure 12:
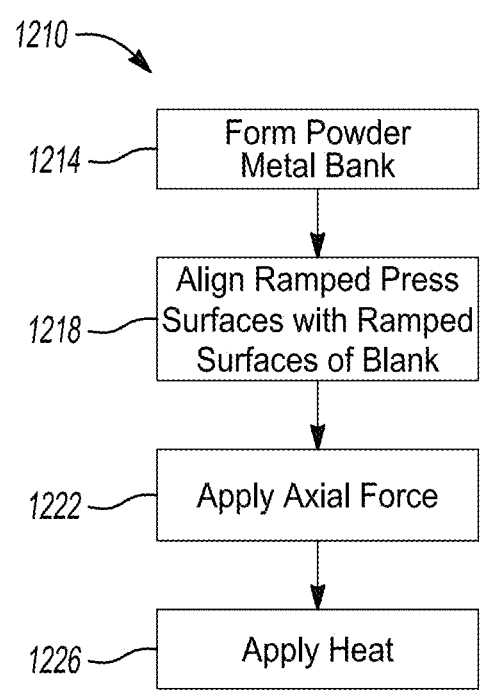
FIG. 12 is a flow chart of a second method of manufacturing a ball ramp component in accordance with the teachings of the present disclosure.
Figure 13:
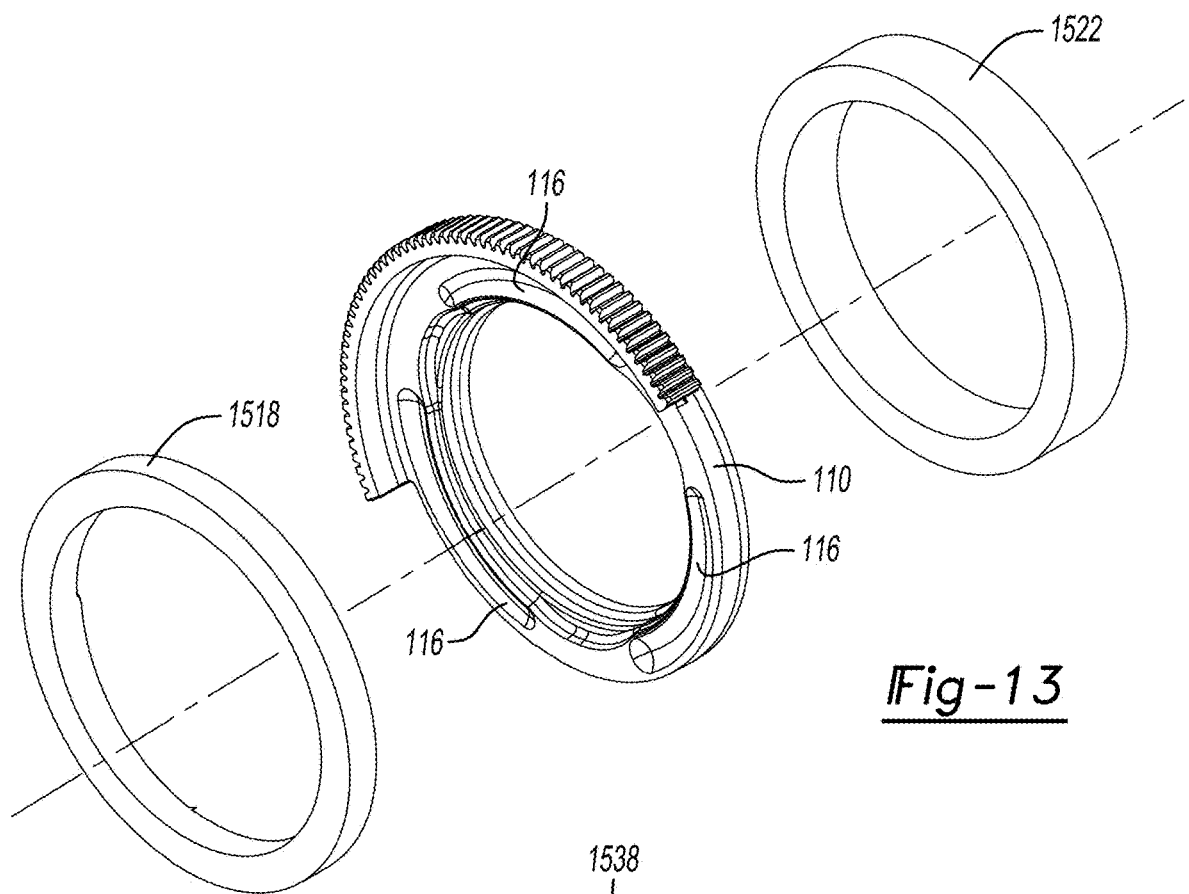
FIG. 13 is an exploded perspective view of a blank of a ball ramp component and a tool, in accordance with the teachings of the present disclosure, for manufacturing the ball ramp component using the method of FIG. 12.
Figure 14:
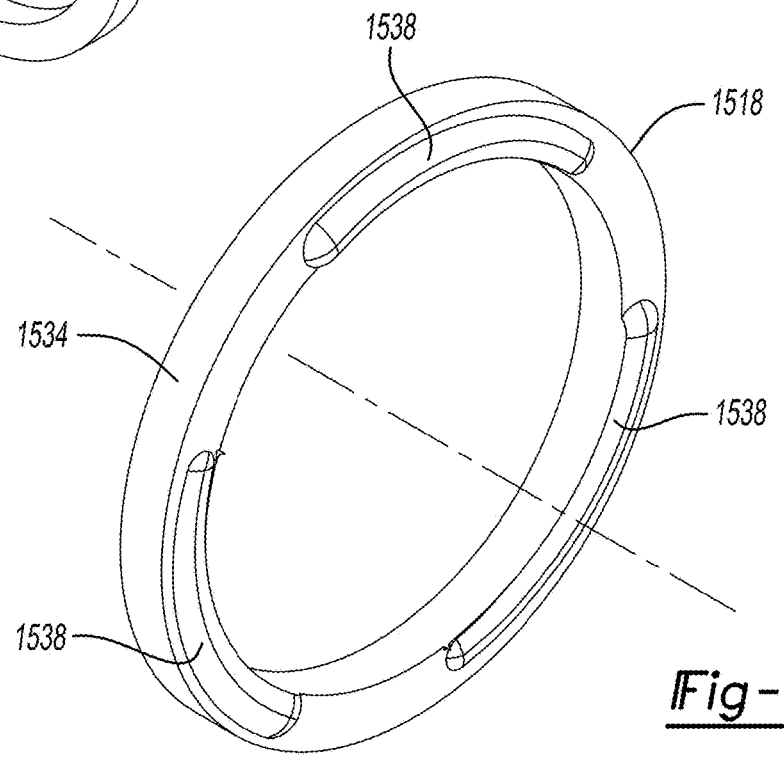
FIG. 14 is a perspective view of a press plate of the tool of FIG. 13.
Figure 15:
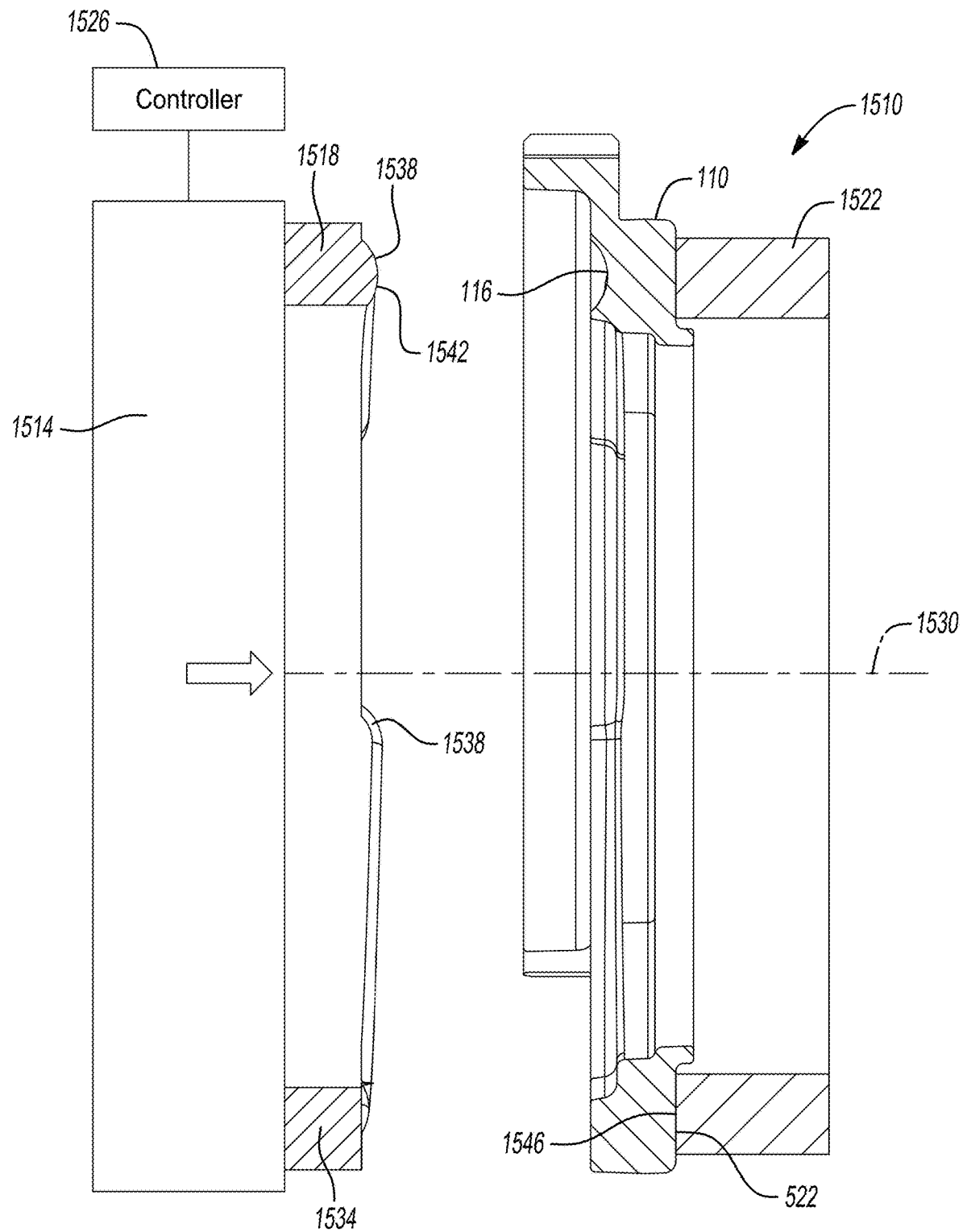
FIG. 15 is a cross-sectional view of the blank and the tool of FIG. 13 in a first position.

Referring to FIG. 12, a second method 1210 of forming a ball-ramp ring (e.g., the first ball-ramp ring 110 or the second ball-ramp ring 112) is illustrated in flow chart form. At step 1214, a compacted powder metal blank is formed similar to step 714 of 710 (FIG. 7). At step 1218, and with additional reference to FIGS. 13-15, the blank first ball-ramp ring 110 is loaded into a densifying tool system 1510.

The densifying tool system 1510 includes a press 1514, a press-plate 1518, a backing plate 1522, and a controller 1526. The controller 1526 is connected to the press 1514 and configured to control operation of the press 1514. The press-plate 1518 mounted to the press 1514 and the press 1514 is configured to move the press-plate 1518 axially along a tool axis 1530.

The press-plate 1518 includes a main body 1534, which in the example provided is an annular body, and a plurality of ramped protrusions 1538 that extend axially from the main body 1534. Each ramped protrusion 1538 is configured to align with a corresponding one of the tracks 116 of the blank first ball-ramp ring 110 and has a shape that is complementary to the shape of the corresponding track 116. The ramped protrusions 1538 can match the tracks 116 or can be slightly larger or smaller than the tracks 116. In the example provided, the ramped protrusions 1538 extend the full length of each track 116. In another configuration, not specifically shown, the ramped protrusions 1538 can extend less than the angular range of the tracks 116 in order to compress only part of the tracks 116. In another configuration, not specifically shown, the angle of the ramp (e.g., the axial position of an outer surface 1542 along the ramped protrusions 1538) can be different than that of the tracks 116 in order to vary compression of the powdered metal along the tracks 116.

In the example provided, the backing plate 1522 includes an annular surface 1546 that abuts the back surface 522 of the blank first ball-ramp ring 110 behind the tracks 116. The blank first ball-ramp ring 110 is mounted to the backing plate 1522 and held axially stationary by the backing plate 1522 in a position that aligns the tracks 116 with the ramped protrusions 1538.

At step 1222, the controller 1526 operates the press 1514 to move the press-plate 1518 axially toward the blank first ball-ramp ring 110 until the ramped protrusions 1538 are received in the tracks 116 and compress the surfaces of the tracks 116 to form the region 610 (FIGS. 5 and 6). The press-plate 1518 and backing plate 1522 are configured not to compress the entirety of the blank first ball-ramp ring 110. In an alternative configuration, not specifically shown, the press-plate 1518 can be held stationary while the blank first ball-ramp ring 110 is translated by the press 1514. In another alternative configuration, not specifically shown, the press 1514 can be configured to translate both the press-plate 1518 and the blank first ball-ramp ring 110 axially toward each other.

The blank second ball-ramp ring 112 can also be locally densified using the method 1210 as otherwise described above with reference to the blank first ball-ramp ring 110 so that the ramped protrusions 1538 can be configured to locally compress the tracks 116 of the blank second ball-ramp ring 112.

After applying axial force at step 1222, the method 1210 can proceed to step 1226 in which the locally densified blank ball-ramp ring 110 or 112 can be heated to be fully sintered similar to step 726 (FIG. 7).

The foregoing description of the exemplary ball-ramp mechanisms and methods have been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of manufacturing an actuator having a first ball-ramp ring, a second ball-ramp ring, and a plurality of balls disposed between the first ball-ramp ring and the second ball-ramp ring, the method comprising:
   compacting a metal powder to form a compacted blank of the first ball-ramp ring, the compacted blank having an annular body, which is disposed about an axis, wherein a plurality of ball-ramp tracks are formed into the annular body and spaced circumferentially about the axis; and
   locally densifying only portions of the compacted blank, wherein each of the locally densified portions includes a first contact surface defined by a corresponding one of the ball-ramp tracks, wherein locally densifying the portions of the compacted blank comprises:
      placing a plurality of spherical bodies between the first contact surfaces and a press plate, each of the spherical bodies being received in a corresponding one of the ball-ramp tracks;
      applying an axial force to at least one of the compacted blank and the press plate to press the spherical bodies against the first contact surfaces; and
      rolling the spherical bodies along the first contact surfaces while applying the axial force.

2. The method according to claim 1, wherein rolling the spherical bodies along the first contact surfaces includes rotating one of the compacted blank and the press plate about the axis relative to the other one of the compacted blank and the press plate while applying the axial force.

3. The method according to claim 2, wherein the spherical bodies are balls.

4. The method according to claim 2, wherein locally densifying the portions of the compacted blank further comprises varying at least one of a magnitude of the axial force and an area on the compacted blank over which the axial force is distributed while rotating the one of the compacted blank and the press plate relative to the other one of the compacted blank and the press plate.

5. The method according to claim 1, wherein the locally densified portions of the compacted blank have a density of at least 7.4 grams per cubic cm.

6. The method according to claim 5, wherein portion of the compacted blank other than the locally densified portions of the compacted blank have a density that is less than 7.4 grams per cubic cm.

7. The method according to claim 1, wherein the locally densified portions of the compacted blank have a density that is greater than or equal to 7.6 grams per cubic cm.

8. The method according to claim 1, wherein the metal powder contains less than 0.3% carbon by weight.

9. The method according to claim 1, wherein the metal powder comprises a sinter-hardening composition.

10. The method according to claim 1, wherein compacting the metal powder to form the compacted blank is performed at a temperature that is below a temperature at which graphite reacts with iron but higher than a temperature at which iron particle sinter bonds develop.

11. The method according to claim 1, further comprising heat treating the compacted blank after locally densifying the portions of the compacted blank.

12. A method of manufacturing an actuator having a first ball-ramp ring, a second ball-ramp ring, and a plurality of balls disposed between the first ball-ramp ring and the second ball-ramp ring, the method comprising:
   compacting a powdered metal material to form a blank of the first ball-ramp ring, the blank having an annular body, which is disposed about an axis, wherein a plurality of ball-ramp tracks are formed into the annular body and spaced circumferentially about the axis;
   providing a plurality of spherical bodies, each of the spherical bodies having a mating surface that is spherically shaped;
   placing each of the plurality of spherical bodies between the first contact surfaces and a press plate, each of the mating surfaces being received in a corresponding one of the ball-ramp tracks;
   transmitting an axial force through the bodies between the blank and the press plate to press the mating surfaces against the first contact surfaces; and
   rolling the mating surfaces along the first contact surfaces while applying the axial force to form a plurality of higher-density regions in the blank, each of the higher-density regions being a discrete and distinct region of the blank that includes the contact surface of an associated one of the ball-ramp tracks and which extends from the contact surface into the annular body of the blank by at least a pre-determined distance.

* * * * *